(12) United States Patent
Rathod et al.

(10) Patent No.: US 12,479,524 B2
(45) Date of Patent: Nov. 25, 2025

(54) ROTATING TRACK GUIDE COMPONENTS WITH WHITE-IRON SEGMENTS

(71) Applicant: Caterpillar Inc., Peoria, IL (US)

(72) Inventors: Chandrasen Rameshlal Rathod, Peoria, IL (US); Eric James Johannsen, Washington, IL (US); Roger L. Recker, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 1149 days.

(21) Appl. No.: 17/199,763

(22) Filed: Mar. 12, 2021

(65) Prior Publication Data

US 2022/0289319 A1 Sep. 15, 2022

(51) Int. Cl.
*B62D 55/14* (2006.01)
*B62D 55/12* (2006.01)

(52) U.S. Cl.
CPC ........... *B62D 55/145* (2013.01); *B62D 55/12* (2013.01)

(58) Field of Classification Search
CPC .............................. B62D 55/145; B62D 55/14
See application file for complete search history.

(56) References Cited

U.S. PATENT DOCUMENTS

| | | | | |
|---|---|---|---|---|
| 4,349,234 A * | 9/1982 | Hartmann | ............... | B62D 55/14 305/194 |
| 4,572,587 A * | 2/1986 | Komp | ............... | B62D 55/14 29/894 |
| 5,141,299 A * | 8/1992 | Korpi | ............... | B62D 55/145 305/137 |
| 5,171,074 A * | 12/1992 | Seksaria | ............... | B60B 11/02 305/137 |
| 5,456,527 A | 10/1995 | Hilgers | | |
| 6,071,204 A | 6/2000 | Jefferies | | |
| 9,663,163 B2 | 5/2017 | Hobe et al. | | |
| 2006/0017323 A1* | 1/2006 | Wodrich | ............... | B62D 55/15 305/202 |
| 2011/0298274 A1* | 12/2011 | Simula | ............... | B62D 55/145 305/194 |
| 2012/0228926 A1 | 9/2012 | Bair | | |

FOREIGN PATENT DOCUMENTS

| | | | | |
|---|---|---|---|---|
| BE | 797190 | | 7/1973 | |
| CN | 103737332 A | | 4/2014 | |
| CN | 206336345 U | | 7/2017 | |
| DE | 1939239 A1 * | | 2/1971 | |
| DE | 10113362 A1 * | | 10/2001 | ............. B62D 55/15 |
| EP | 0360974 A2 * | | 4/1990 | |
| EP | 3135568 | | 3/2017 | |
| JP | H06076729 | | 10/1994 | |
| KR | 10-2011-0001878 | | 1/2011 | |
| WO | 2014008537 A1 | | 1/2014 | |

* cited by examiner

Primary Examiner — Kip T Kotter

(57) ABSTRACT

A method of producing a rotating guide component for a track assembly includes fixing at least one wear member to an outer surface of a tubular or annular substrate. The at least one wear member includes an inner portion, and the tubular or annular substrate includes an outer portion. The inner portion is mated to the outer portion, and the wear member is brazed to the tubular or annular substrate.

20 Claims, 12 Drawing Sheets

ROTATING TRACK GUIDE COMPONENTS WITH WHITE-IRON SEGMENTS

TECHNICAL FIELD

The present disclosure relates generally to a rotating track guide components such as track idlers, track rollers, and sprockets etc. that are designed to resist wear. More particularly, the present disclosure relates to such track guiding components that include a wear member that contacts the track chain and resists wear.

BACKGROUND

Track type machines typically utilize track chains on each side of the machine that engage the ground surface during propulsion of the machine. A plurality of individual links are pivotably coupled via bushing and pin arrangements to form the track chain. A sprocket, driven by an engine of the machine, engages the bushings and translates the chain about one or more idlers. As the chain translates, the connected links engage a ground surface under the machine, for example, via coupled track shoes, and propel the machine on the surface. Track chains can be a straight link chains with alternating inner and outer links or can be offset link chains where all the links are alike. In both types of track chains, the elements wear over time, particularly the bushings that are continuously engaging with the sprocket in order to propel the machine. Hardening elements of the track chain may increase the durability and wear-resistance of the track chain element but may also increase the brittleness or otherwise negatively affect the properties of the track chain element. As such, wear-resistance, and strength, along with costs of production and maintenance, are often important considerations in the manufacture and assembly of the track chain. Track guide components such as the idler, sprocket, and track rollers may also contact the track chain element and may wear over time.

A prior art track roller is disclosed in Chinese Pat. No. 206336345U ("the '345 patent"). The '345 patent discloses a packing ring structure that is used in the welding of a large scale crawler-type engineering machine with a track roller that includes a wheel body (1) and a second wheel body (2) that are spliced together via welding with an annular washer (3) at the seam. The weld bond is inboard of first wheel body and the second wheel body. The assembly is structured with a step, forming an annular channel into which the annular washer (3) is placed during the installation. This arrangement helps to provide a robust assembly that is less like to fracture at this seam.

However, there is exists a need for a track roller or other track guide component that is more resistant to wear than has been yet been devised.

SUMMARY

In one aspect, a track roller for a track assembly may include a tubular roller substrate having a longitudinal length and an outer surface that includes at least one flat portion or one curved portion. The track roller may also include at least one wear member. The at least one wear member may be fixed to the outer surface of the tubular roller substrate. In some embodiments, at least one flat portion of the tubular roller substrate mates with the flat inner surface of the at least one wear member, or the at least one curved portion of the tubular roller substrate mates with the curved inner surface of the at least one wear member.

In another aspect, a sprocket for a track assembly comprises an annular hub that has a longitudinal length, an outer surface, and an annular sprocket substrate, wherein the outer surface includes at least one flat portion or at least one curved portion. At least one wear member is provided that includes a flat inner surface or a curved inner surface, and the at least one wear member is fixed to the annular sprocket substrate. In some embodiments, the at least one flat portion of the annular sprocket substrate mates with the flat inner surface of the at least one wear member, or the at least one curved portion of the annular sprocket substrate mates with the at least one curved inner surface of the at least one wear member.

In yet another aspect, a method of producing a rotating guide component for a track assembly may include fixing at least one white iron member to an outer surface of a tubular or annular substrate. The at least one white iron member may include an inner portion, and the tubular or annular substrate may include an outer portion that is configured to mate with the inner portion.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements but may include other elements not expressly listed or inherent to such a process, method, article, or apparatus. In this disclosure, relative terms, such as, for example, "about," "substantially," and "approximately" are used to indicate a possible variation of ±10% in the stated value.

Figure 1:
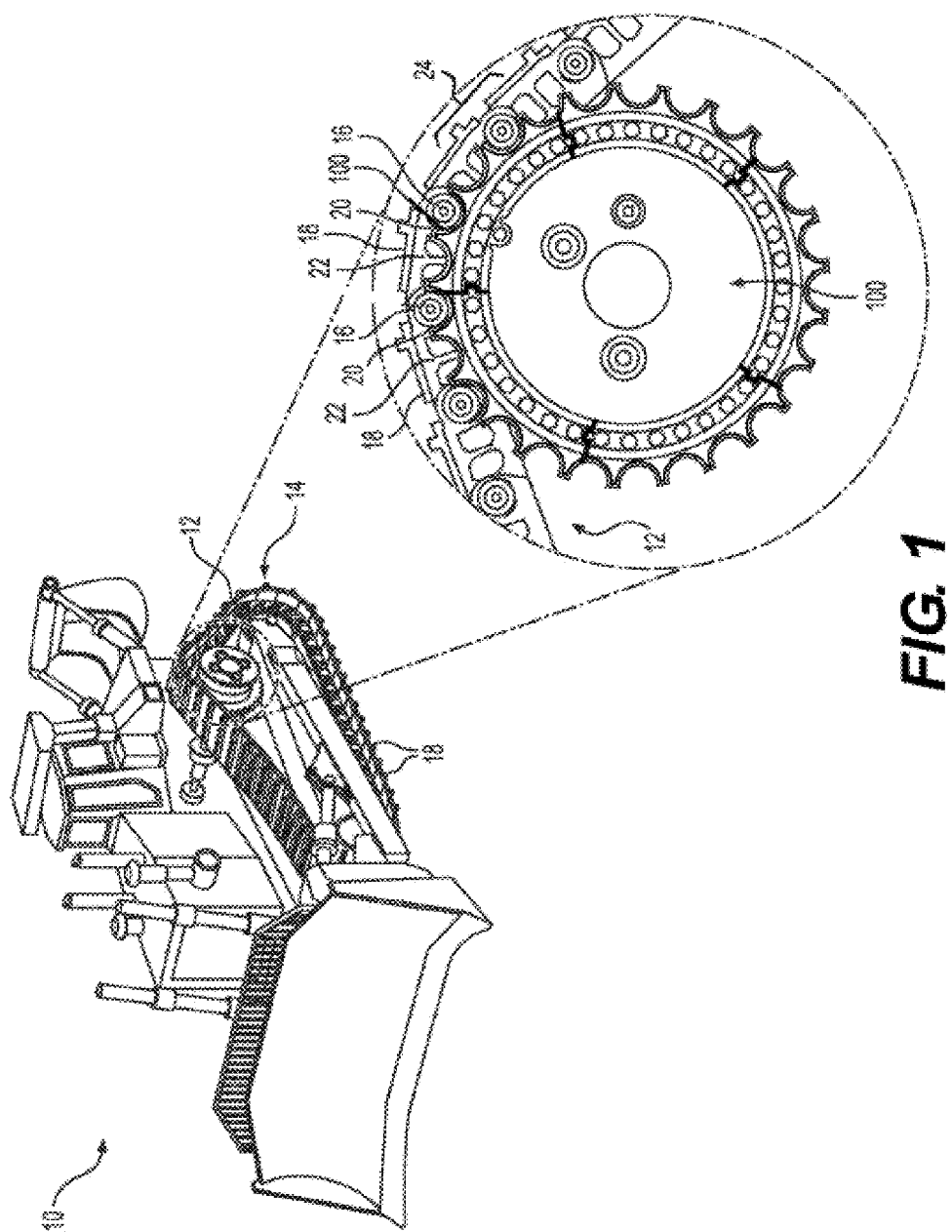
FIG. 1 is a perspective view of an exemplary machine, with an enlarged section of the exemplary machine showing the engagement of a sprocket and bushings of a track chain assembly. The sprocket includes wear resistant components on its periphery that engage the bushing of the track chain assembly.

FIG. 1 illustrates a machine 10 with a track assembly 12 according to the present disclosure. Machine 10 may be a track-type tractor or any mobile machine that performs some type of operation with an industry, such as mining, construction, farming, transportation, or any other industry known in the art, for example, a dozer, an excavator, a loader, a backhoe, a motor grader, or any other earth moving machine. In one aspect, machine 10 may be a medium track-type tractor. In other aspects, however, machine 10 may be a small track-type tractor or a large track-type tractor. Track assembly 12, which may also be referred to as a track link assembly or a track chain assembly, may be coupled to an undercarriage assembly 14 of machine 10 and driven by a machine engine or other power source (not shown) via at least one drive gear or sprocket 100. A separate track assembly 12 may be coupled to each side of machine 10, with each track assembly 12 forming separate endless loops. A plurality of track shoes 18 may be coupled to an outer surface of track assembly 12 in order to aid in the engagement of the ground surface.

Track assembly 12 may be a chain that includes multiple structurally similar link subassemblies, each of which may include a pair of links. A pair of links may include a link 22 and a respectively paired link (not shown in the enlarged section of FIG. 1, which is a side view) that is parallel and spaced opposite from link 22. Links 22 and their respectively paired links may be straight or offset links, and each include apertures at respective opposite ends (e.g., a first-end aperture and a second-end aperture).

Successive link subassemblies may be coupled by a pin 16 and a bushing 20. For example, to couple a first link subassembly with a successive a second link subassembly, pin 16 may be fixedly received in the first-end apertures of the links of the first link subassembly and bushing 20 may be fixedly received in the second-end apertures of the links of the second link assembly. As such, pin 16 and bushing 20 couple two link subassemblies 24 together to form a portion of track assembly 12.

Each pin 16 may be a substantially cylindrical rod and may be sized to be slip fit through bushing 20. Each bushing 20 may be generally cylindrical, with a cylindrical channel extending longitudinally through bushing 20 as a bore. The bore and the pin may have a constant diameters, but not necessarily so.

Figure 2:
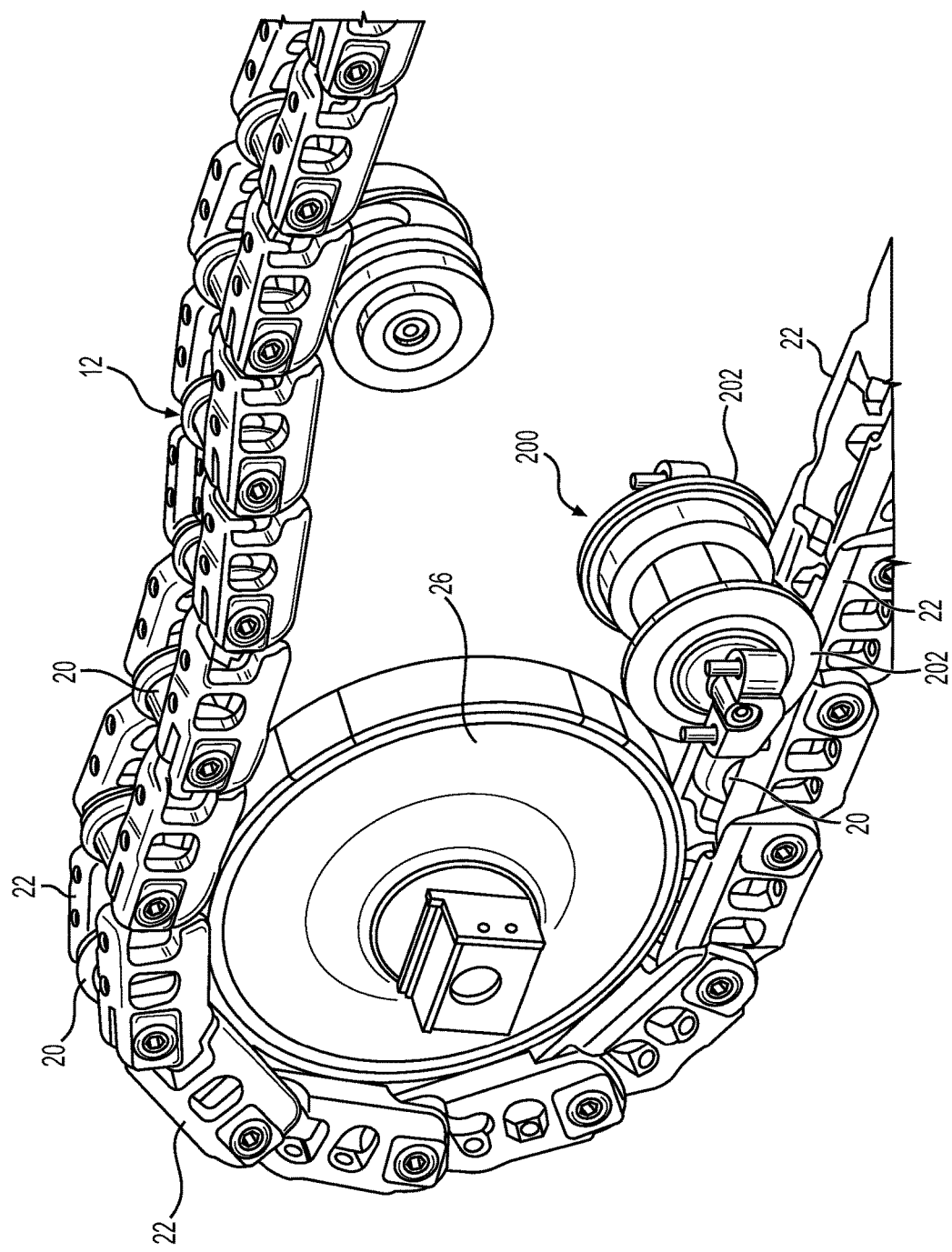
FIG. 2 is a perspective view of a track chain assembly similar to that employed in FIG. 1 matting with track guide components such as an idler and track roller components that are constructed with wear resistant components according to various embodiments of the present disclosure.

Looking at FIG. 2, one or more track rollers 200 and idlers 26 may be provided to guide to the track assembly 12 as it rotates to propel the movement of the machine. For example, the idler 26 may fit between the links 22 and contact the bushings 20 as shown or may include a ridge (not shown) bordered by two shoulders such that the shoulders contact the rail surfaces of the links 22 while the ridge fits between the links 22. Either way, the idler 26 helps to prevent lateral movement of the track assembly 12 so that it does not fall off the undercarriage while also being able to rotate with the track assembly 12.

Similarly, the track roller 200 may include two outer rim portions 202 that fit on the lateral outside surfaces the of the links 22, helping to prevent the track assembly 12 from falling off the undercarriage, while also being able to rotate with the track assembly 12. Hereinafter, an idler will be interpreted to be a subset of a track roller since both serve similar functions and can be manufactured in similar ways. Therefore, the term "track roller" is to be interpreted broadly in the claims to include idlers, which may in some cases only differ from smaller track rollers in terms of size as depicted in FIG. 2.

Figure 3:
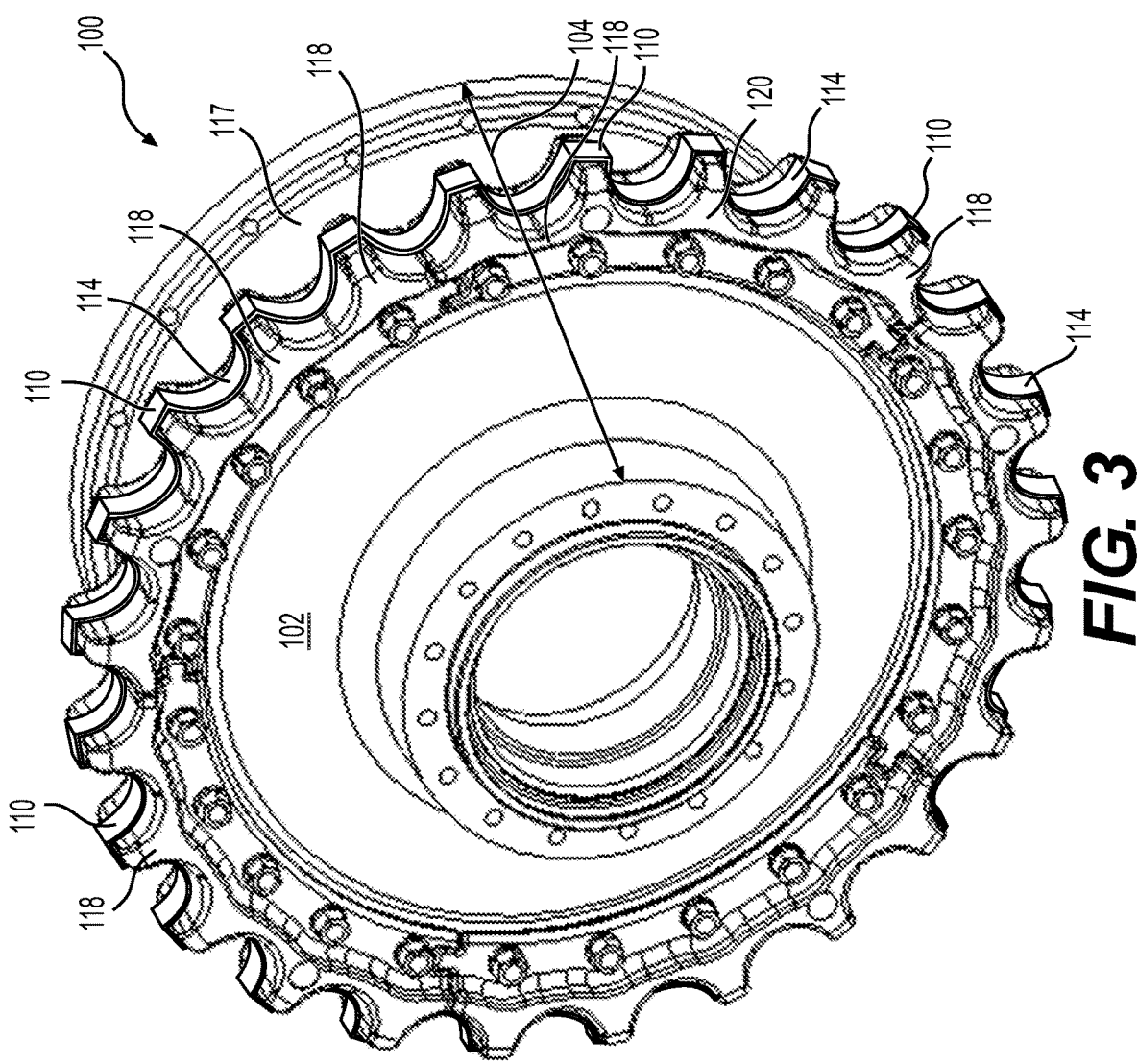
FIG. 3 illustrates a perspective view of a sprocket assembly shown in isolation that may be employed in FIG. 1.
Figure 4:
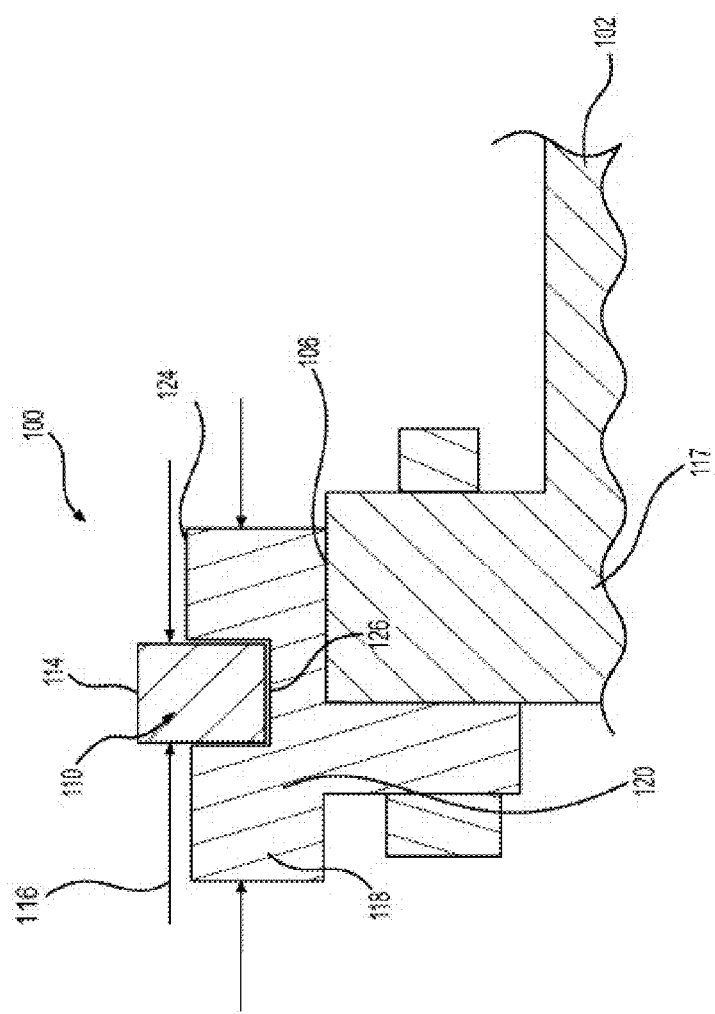
FIG. 4 is a cross-sectional view of the sprocket assembly of FIG. 3 taken along a plane having the radial and the axial directions thereof.
Figure 5:
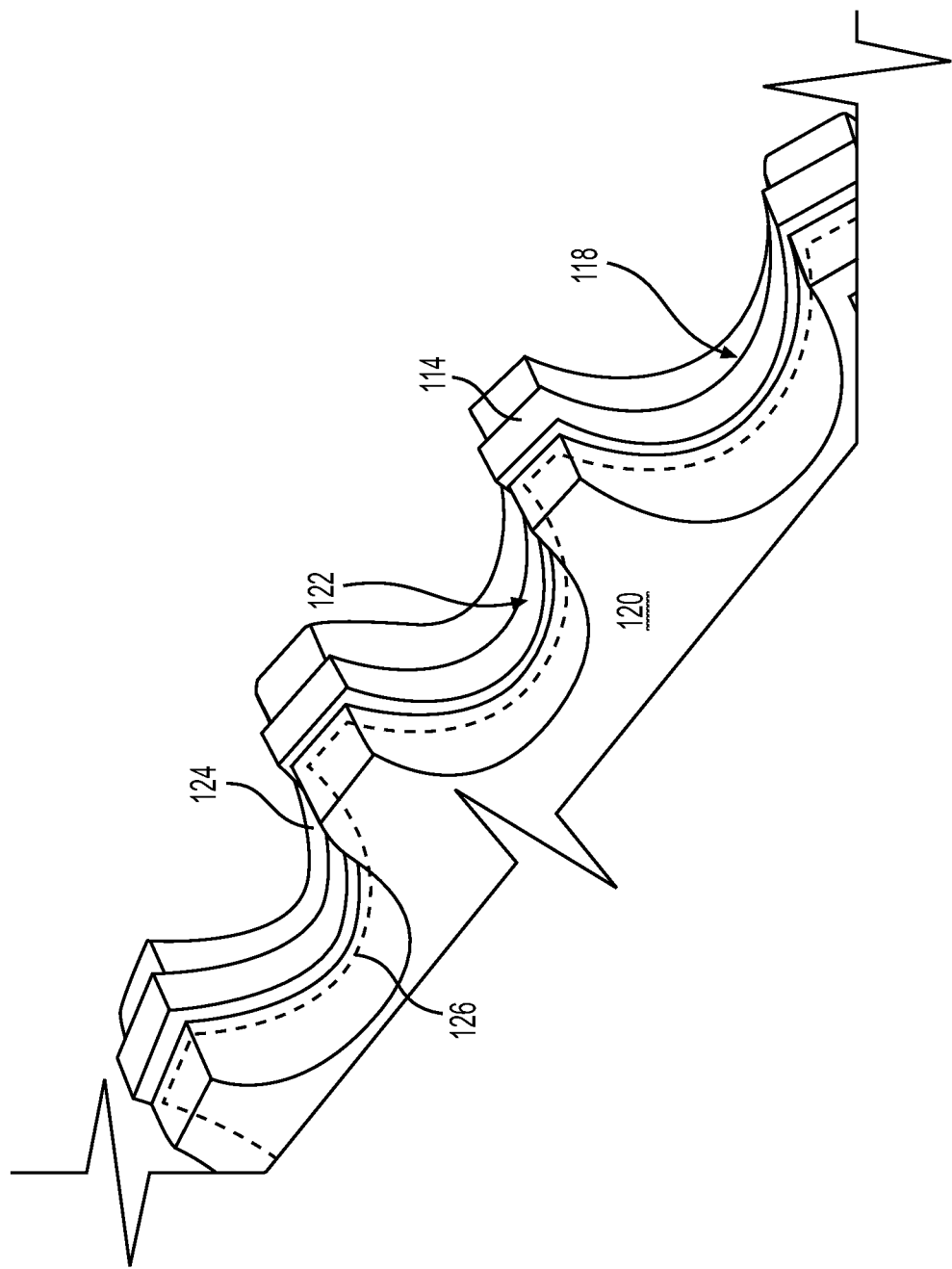
FIG. 5 is an enlarged detail view of the sprocket assembly of FIG. 3, illustrating the assembly of a wear member into the pocket of the sprocket member.
Figure 6:
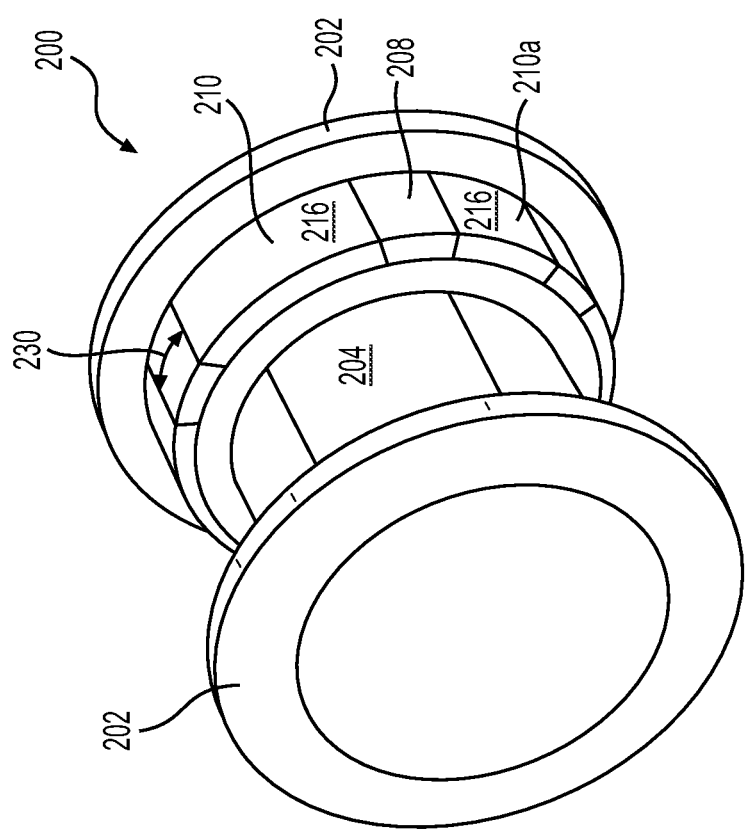
FIG. 6 illustrates a perspective view of a track roller assembly similar to that shown in FIG. 2 shown in isolation.
Figure 7:
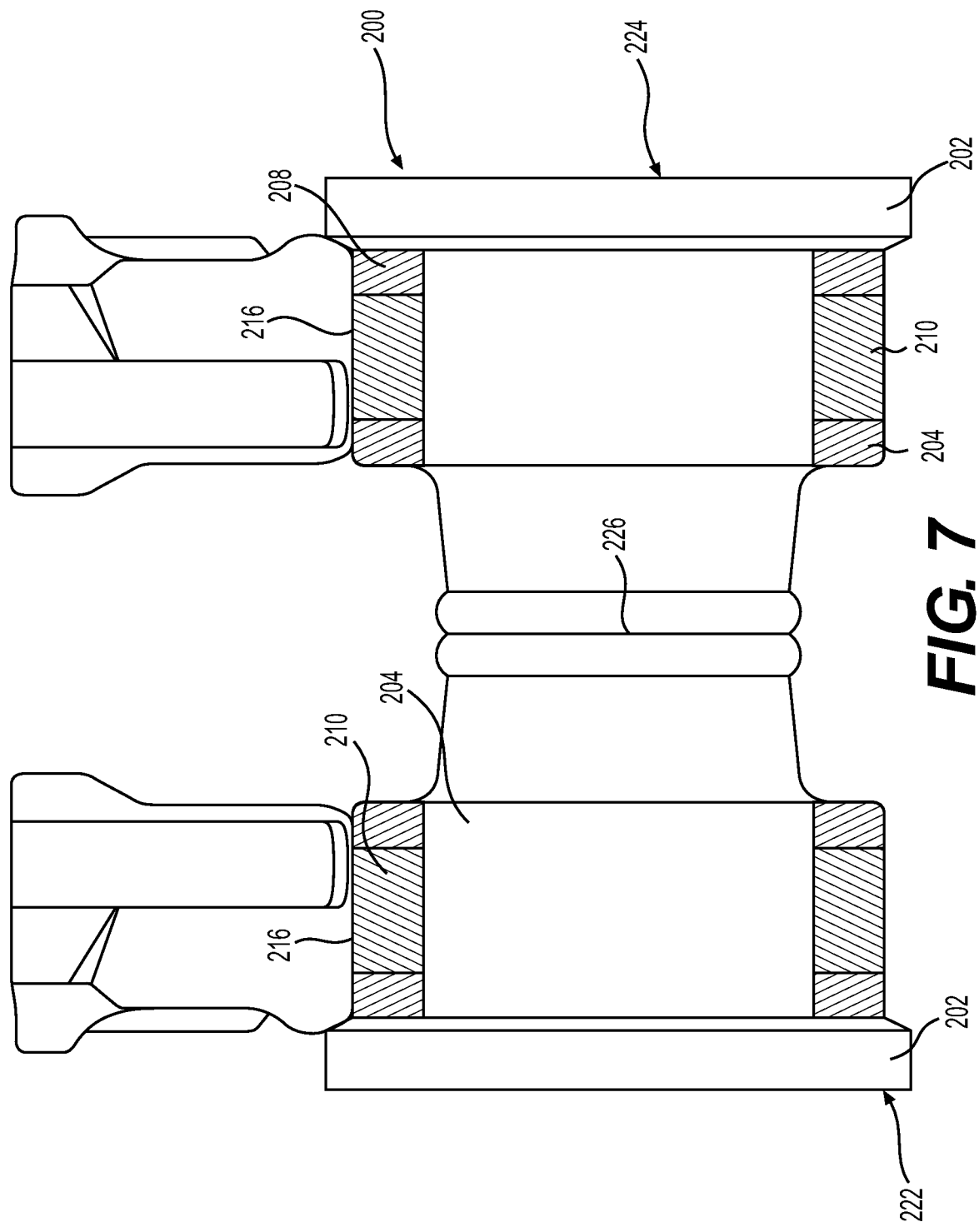
FIG. 7 is a side view of a track roller assembly similar to that of FIG. 6, illustrating the track links contacting the track roller.

Looking at FIGS. 3 thru 5, a sprocket 100 according to an aspect of the present disclosure may include annular hub 102 having a longitudinal length 104 and an outer surface 106. The outer surface 106 on which at least one wear member 110 is attached either directly or indirectly. As shown, a sprocket segment 118 may form part of the wear member and may be used to attach the wear member 110 to the annular hub 102. This may not be the case for other embodiments of the present disclosure. Any wear member discussed herein may be more wear resistant than the substrate or other component to which the wear member is attached.

The at least one wear member 110 may take the form of a first white iron member that includes an undulating outer surface 114 defining an outer surface longitudinal length 116. The first white iron member may extend over a central portion 117 of the annular hub 102 (e.g., circumferentially). The at least one white iron member may extend less than an entirety of the longitudinal length 104 of the annular hub 102, as well as less than the entirety of the outer surface longitudinal length 116 (see FIG. 4), but not necessarily so.

More specifically as see in FIGS. 4 and 5, the at least one wear member may take the form of a sprocket segment 118 including an annular sprocket substrate 120 that is an inner portion (e.g., radially) of the sprocket segment 118. The first white iron member may be an outer portion 122 (e.g., radially) of the sprocket segment 118 as seen in FIG. 4, being configured to engage a bushing of the track assembly. The sprocket segment may be fastened to the inner hub, or may be otherwise attached (e.g., brazed, welded, etc.).

In some applications as seen in FIG. 5, the annular sprocket substrate 120 may define an inner undulating surface 124 that is divided longitudinally by an undulating pocket 126. The first white iron member (e.g., see 122) may be disposed in the undulating pocket 126, forming the outer undulating surface 114 that is spaced outwardly (e.g., radially) from the inner undulating surface 124.

The first white iron member (e.g., see 122) may be brazed to the annular sprocket substrate 120 that may be formed of steel, and at least a portion of the annular sprocket substrate 120 may be carburized. As shown in FIG. 3, a plurality of sprocket segments with white iron members attached thereto may be provided. Other configurations are possible in other aspects of the present disclosure.

In other applications, the sprocket segment itself may be entirely made of a wear resistant material, and act as the wear member. In other applications, such as when the sprocket segment includes an undulating wear member with a wear resistant material that fits into an undulating pocket, the undulating wear member (e.g., see 122 in FIG. 5) may be formed using a pressing process via a brake press, a progressive die, etc.

Referring now to FIGS. 6 thru 9, a track roller 200 as previously mentioned herein will now be described.

The track roller 200 comprise a tubular roller substrate 204 having a longitudinal length 206 and an outer surface 208. The outer surface 208 may include at least one wear member 210. This wear member 210 may be fixed to the outer surface 208 of the tubular roller substrate 204. A bore 214 (see FIG. 8) may extend completely through the track roller, forming the tubular shape. Put another way, the track roller substrate 204 may be hollow having a bore 214 that extends completely through the track roller substrate 204 along the longitudinal length 206 thereof. Also, the track roller substrate may be formed as an assembly of at least two roller components 222, 224 that are attached to each other at a seam 226 (e.g., via welding, fastening, etc.).

The at least one wear member 210 may take the form of a first white iron member that includes a curved (i.e., arcuate) outer surface 216. As shown, the at least one white iron member may extend less than an entirety of the longitudinal length 206 of the tubular roller substrate 204. This may not be the case in other applications.

At least two white iron members (e.g., see 210, 210a) may be spaced apart circumferentially around the tubular roller substrate 204. In some cases, the two white iron members each span a circumferential angle 220 of approximately 45 to 120 degrees of the tubular roller substrate 204.

Any of the white iron members may be brazed to the tubular roller substrate 204 that may be formed of steel, and at least a portion of the tubular roller substrate 204 may be carburized. Other methods of construction and assembly may be employed in other applications.

The tubular roller substrate 204 may also include a central portion with a polygonal cross-section defining a predetermined number of a plurality flat portions. The same number of white iron members as the predetermined number of flat portions may be provided. In such a case, each of the white iron members may be brazed to one of the flat portions of the polygonal cross-section. Other configurations are possible in other applications.

The white iron members may form gaps 230 circumferentially between adjacent white iron members, and at least one of the white iron members may have a different size than another of the white iron members. This may not be the case in other applications.

As alluded to earlier herein, the wear member(s) 110, 210 may be wear-resistant. When a sprocket 100 and/or a track roller 200 are used in track assembly 12, wear member(s) 110, 210 may serve as a wear-resistant layer, providing the sprocket or the track roller with enhanced wear resistance when they engage the bushings or links of the track assembly. In general, the wear member(s) 110, 210 may be or include at least one member, wherein such a member may be an at least partially cylindrical member (e.g., rounded outer surface) or an arc segment. In some embodiments, these wear members may include at least one arc segment (e.g., a single arc segment or a plurality of arc segments) fixed to outer surface of a track roller or a sprocket.

Figure 9:
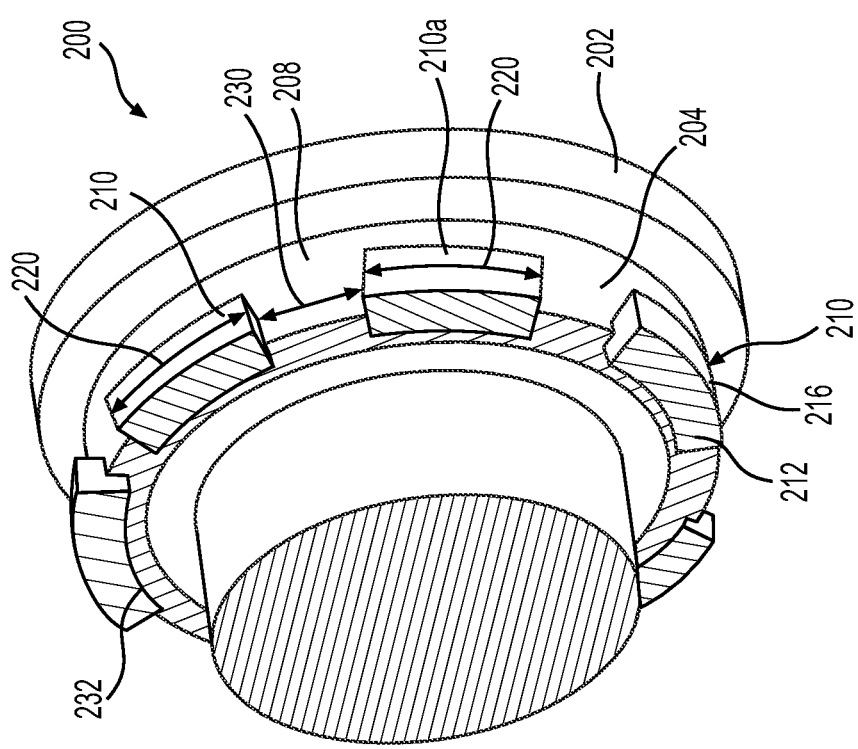
FIG. 9 is a cross-sectional view of a track roller assembly similar to that of FIG. 6 taken along a plane containing the radial and the circumferential direction thereof.

In some embodiments, as shown in FIG. 9, the wear member 210 may be provided as a replacement part and may include a curved outer surface 216 and a curved inner surface 212. Additionally, the outer surface 208 of the substrate may include one or more flat outer surfaces. The curved inner surface 212 may be coupled to flat outer surface at an interface 232. As discussed in detail below, interface 232 may include one or more coupling mechanisms, for example, brazing materials. Similar statements may be made about the sprocket described earlier herein.

Figure 8:
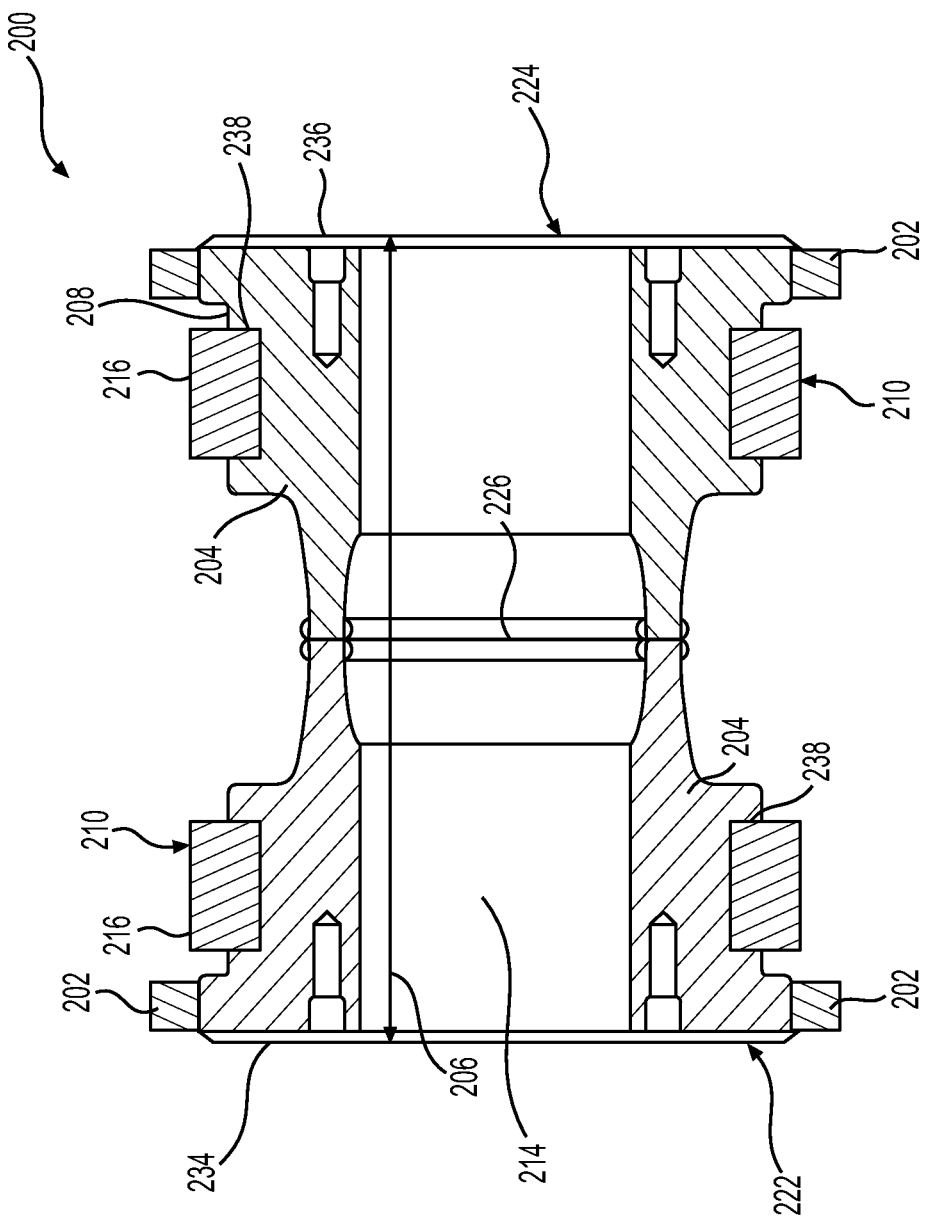
FIG. 8 is a cross-sectional view of a track roller assembly similar to that of FIG. 7 taken along a plane containing the radial and axial directions thereof with the track links removed.

Looking at FIG. 8, it may be understood that the tubular roller substrate 204 may have a first longitudinal end 234, and a second longitudinal end 236 along the longitudinal length 206 with a bore 214 extending therethrough for receipt of a shaft (not shown) about which the roller may rotate. Accordingly, the bore may have a substantially consistent diameter but not necessarily so.

A recess 238 (e.g., a pocket, etc.) may be formed on the outer surface 208 of the tubular roller substrate 204. For example, the recess 238 may be formed in the portion of the outer surface 208 about the central portion 218. The recess 238 may be a circumferential recess traversing the entire circumference or one or more sections of the circumference.

For example, as shown in FIG. 8, the recess 238 may be longitudinally spaced inwardly from the first longitudinal end 234, and the second longitudinal end 236, but not necessarily so. A wear member 210 may be at least partially disposed in the recess 238 and may be radially proud to provide a contact surface for the links of the track assembly. The recess 238 may include and/or form a flat portion of the outer surface 208, which may be coupled to the flat inner surface to form interface 232 in other aspects of the current disclosure.

Accordingly, the thickness of the substrate, for example, may vary around its circumference as indicated by FIG. 9. The thickness of the central portion 218 may be approximately 10 mm, or approximately 7 mm, or approximately 4 mm, at a thinnest portion, and may widen to approximately 12 mm to 25 mm, for example, approximately 15 to 18 mm in some applications. The number of the recesses, as well as the configuration and placement may vary to be different than what is shown.

Figure 10:
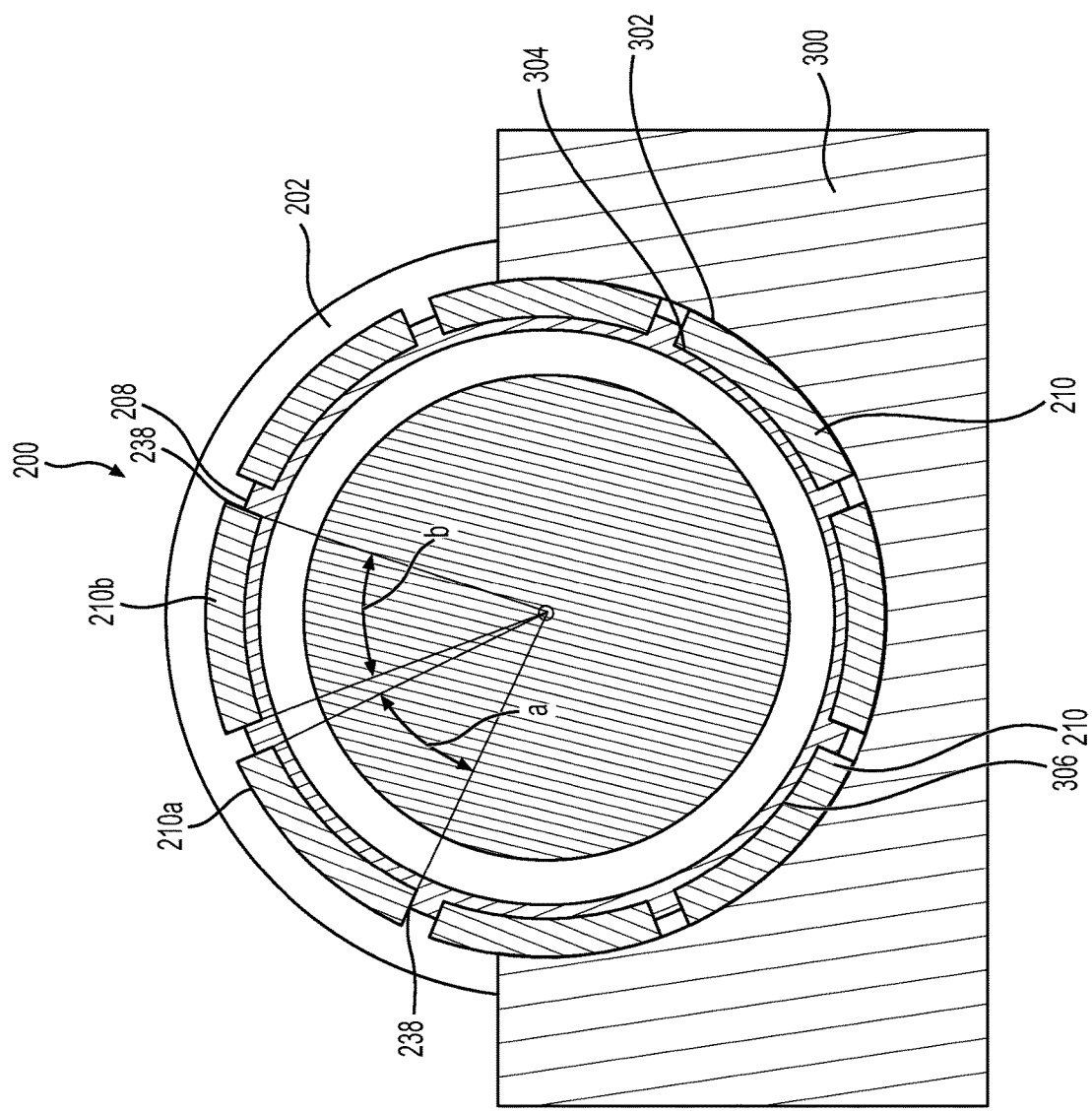
FIG. 10 illustrates a fixture that may be used to braze the hardened components onto a track roller assembly similar to that of FIGS. 6 thru 9.

As alluded to earlier herein, the track roller 200 may be a faceted roller, and tubular roller substrate 204 may include a plurality of sides, faces, and/or rounded portions. For example, recesses 238 may be separated by non-recessed portions of tubular roller substrate 204 as indicated by FIG. 10.

Wear member(s) 210 may include a first arc segment 210a, and a second arc segment 210b fixed to outer surface 208 of tubular bushing substrate 204. Arc segments 210a, 210b may be successively arrayed along a circumferential direction around tubular roller substrate 204, for example, within recesses 238, as shown in FIG. 8 or on faceted sides, etc.

Arc segments 210a, 210b have curved outer surfaces 216 and flat inner surfaces. Accordingly, the thickness of arc segments 210a, 210b changes based on the location along the arc of arc segments 210a, 210b (e.g., gradually increasing or decreasing along a circumferential direction around tubular roller substrate 204), but the thickness of arc segments 210a, 210b may be constant along a longitudinal length 206 of tubular roller substrate 204 as shown in FIG. 10. In one example, the edges of arc segments 210a, 210b may be approximately 1 to 3 mm, and the central portions of arc members 210a, 210b may be approximately 5 to 15 mm, for example, approximately 8 mm. Additionally, in some aspects, edges of arc segments may be thinner than 1 mm and may substantially eliminate gaps and/or transitions between recesses 126 and portions therebetween.

Arc segments 210a, 210b may each have a thickness such that a portion of each of arc segments 210a, 210b protrudes out of recess 238 in a radial direction. For example, arc segments 210a, 210b may extend radially beyond central portion 218. However, it is also possible for arc segments 210a, 210b to be flush with outer surface of central portion 218, for example, extend radially to be flush with any portion between the recesses 238. The depth of recess 238 may depend on the thickness of the wear member(s) 210, which in turn may depend on the material that forms the wear member(s) 210. The overall outer diameter of track roller 200 (including the member(s) 210) may depend on the application of the track roller 200 (e.g., type and/or size of track assembly 12, machine 10, whether is used as an idler, etc.).

As shown in FIG. 8, the wear member(s) 210 may extend less than an entirety of the longitudinal length of tubular roller substrate 204. However, it is also possible for the wear member(s) 210 to extend over the entire longitudinal length 206 of tubular roller substrate 204.

These arc segments 210*a*, 210*b* may span a majority of recesses, for example, approximately 90% of recesses 238, or arc segments 210*a*, 210*b* may span an entirety of recesses 238. Moreover, arc segments 210*a*, 210*b* may span angles a and b, respectively as shown in FIG. 10. Angles a and b may each span angles of approximately 45 to 60 degrees of the outer circumference of tubular roller substrate 204. Angles a and b may be approximately the same, or one of angles a and b may be larger than the other angle. The wear members 210 may thus span a total of approximately 90 to 240 degrees of the outer circumference of tubular roller substrate 204.

It is noted that the wear member(s) 210 may include one, three, four, or more arc segments, and may span any portion of the outer circumference of tubular roller substrate 204, for example, any angle that is greater than 0 degrees and less than or equal to 360 degrees. Moreover, individual arc segments (e.g., 210*a*, 210*b*) may span any portion of the outer circumference of tubular roller substrate 204, for example, any angle that is greater than 0 degrees, and less than or equal to 180 degrees, and the angle may be continuous or discontinuous. In some embodiments, the wear member 210 may span an angle in a range of approximately 90 degrees to 360 degrees, and the individual wear members (e.g., 210*a*, 210*b*) may span an angle in a range of from approximately 30 degrees to approximately 180 degrees. Similar statements may be made regard to the wear members of the sprocket discussed earlier herein.

In general, the wear members 110, 210 and the substrates 120, 204 may be formed of different respective materials. Constituent member(s) of the wear members 110, 210 may be formed of a wear-resistant material, such as white iron. In this disclosure, the term "white iron" means cast iron in which all or substantially all carbon is present as carbide. When formed of white iron, member(s) of outer members 120, 220 may be referred to as white iron member(s). Examples of white iron include pearlitic (FeC) white irons, Ni-hard or Ni—Cr ($M_3C$) white irons, Ni-hard 4 ($M_7C_3$) white irons, and high-Cr ($M_7C_3$) white irons (also referred to as "high chrome white irons"). In some embodiments, outer members 120, 220 may include white iron member(s) formed of a high chrome white iron having a chromium content of 12 wt. % or higher (e.g., a chromium content of 12 wt. %, 15 wt. %, 20 wt. %, or 25 wt. %) and suitable contents of other elements (e.g., a carbon content in a range of 2 to 3 wt. %, a molybdenum content of 0.5 to 3.5 wt. %, a manganese content of 0.5 to 1.5 wt. %, a silicon content of up to 1.0 wt. %, and a nickel content of up to 0.5 wt. %), with a balance being iron. Examples of white irons include white irons specified by ASTM A532 (e.g., ASTM A532 II-A, II-B, II-C, II-D, II-E, and III-A high chrome cast irons, and ASTM A532 Ni-hard cast irons). White irons may also be referred to as abrasion-resistant cast irons. While examples of white irons have been given, the present disclosure is not so limited, and it is understood that a white iron member may be formed of any suitable hard wear facing white iron.

In contrast, the substrates 120, 204 may be formed of steel of any suitable type and may be formed by any formation process. In one aspect, the substrates 110, 210 may be formed in casting process. In some embodiments, the substrates 102, 204 may be formed of high-carbon chromium steel. High-carbon chromium steel encompasses chromium-containing steel having a carbon content of 0.55 wt. % or higher, such as 52100 alloy steel. The steel forming these substrates may be heat-treated (e.g., using induction or furnace heating) or non-heat-treated steel. Examples of heat treatment processes include carburization and case hardening. For example, carburizing one or more portions of the substrates 120, 204 may yield a high-carbon steel. In some embodiments, in addition to or as an alternative to using high-carbon chromium steel for tubular bushing substrates 120, 204, the outer surface of the substrates 110, 210 may be carburized at locations where these wear members 110, 210 are disposed. For example, the part of the outer surface within recesses or flat inner portions may be carburized. It is noted that the aforementioned carburization steps may be performed before and/or after brazing or otherwise coupling the wear members to the substrates. Alternatively, one or more portions of the substrates may be hardened by induction hardening, or direct hardened In general, portions of the wear members 110, 210 may have any suitable shape, size, and/or surface texture. For example, an arc segment may be a small arc, a large arc, button-shaped, rounded, smooth, or rough. The coverage area of one arc segment on the circumference of the substrate may be non-rectangular (e.g., may be round, diamond-shaped, etc.). The arc segments constituting the wear members 110, 210 may have any suitable combination of differing shapes, differing sizes, and/or surface textures, to form a patchwork on the substrate.

The arc segments of the wear members may be fixed to the outer surfaces of the substrates by any suitable fixation method, for example, soldering, welding, bonding, or one or more other coupling mechanisms. In some embodiments, and as discussed herein, the segments are brazed to the outer surfaces of the substrates, for example, by melting and/or flowing (e.g., by capillary action) a filler metal (e.g., one or more of aluminum-silicon, copper (e.g., copper powder), copper-silver, copper-zinc (brass), copper-tin (bronze), gold-silver, a nickel alloy (e.g., Nicrobraz 152 by Wall Colmonoy), silver, an amorphous brazing foil using nickel, iron, copper, silicon, boron, phosphorous, and/or other materials) between the wear members, and the substrates. In this aspect, the segments of the wear members are fixed to the substrates via a solidified brazing filler. The solidified brazing filler may be referred to as a brazed joint.

INDUSTRIAL APPLICABILITY

A track roller, and/or a sprocket as well as a wear member according to any embodiment discussed herein may be provided as a replacement part in the field or in an OEM (Original Equipment Manufacturer) context.

The disclosed aspects the rotating guide components may be used with a track assembly 12 may be used in any machine that includes a tracked undercarriage that includes links coupled together to form one or more tracks. As a result, these rotating track guide components as described herein may provide greater wear-resistance, a longer work duration, an increased performance, a reduced risk of deformation, and a lower likelihood of requiring maintenance or replacement.

Figure 11:
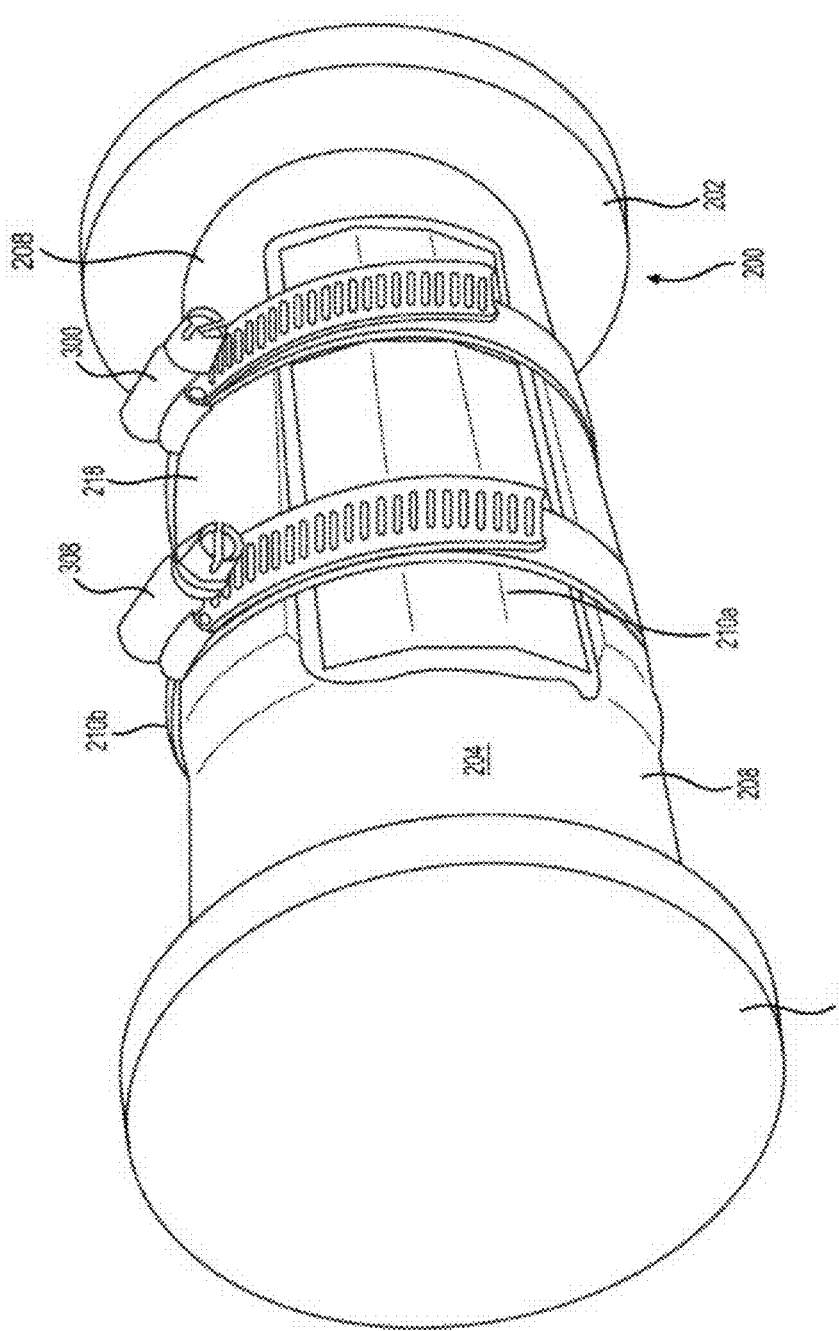
FIG. 11 illustrates hose clamps used to hold the hardened components in place during assembly/brazing of a track roller assembly similar to that shown in FIGS. 6 thru 9.

FIGS. 10 and 11 illustrate holding fixtures that may be used to help produce track roller 200, for example, by brazing a plurality of segments (e.g., arc segments 210*a*, 210b) to the tubular roller substrate 204. Although arc segments 210a, 210b are discussed below, the aspects of FIGS. 10 and 11 may be implemented to braze and join the wear members to a sprocket segment. In such a case, a standard vise may be employed in addition to or in lieu of the fixture that will now be described.

As shown in FIG. 10, the brazing method may be performed using a holder or a fixture 300. The fixture 300 may have a holding surface 302 designed to hold a wear member 210 in place while brazing to tubular roller substrate 204. Furthermore, a brazing filler 304 may be positioned between the wear member(s) 210 (or 110) and the tubular roller substrate 204 (or 120). Brazing filler 304 may be in the form a sheet or foil (e.g., pure copper, a copper-based alloy, pure nickel, a nickel-based alloy, or a blend of copper-based and nickel-based alloys) that may be positioned between the interface of the wear member(s) and any substrate 120, 204.

Additionally, or alternatively, a brazing paste 306 may be positioned and/or applied between and/or around the interface of any wear member and any substrate. For example, brazing paste 306 may be applied as a bead around a perimeter of arc segments 210a, 210b. Brazing paste 306 may include a powder (e.g., pure copper, a copper-based alloy, pure nickel, a nickel-based alloy, or a blend of copper-based and nickel-based alloys) and a binder material (e.g., a water-based gel suspension agent). The binder material may burn off when heated (e.g., via a brazing procedure in a furnace). The brazing procedure may be performed with brazing filler 304, with brazing paste 306, or with both brazing filler 304 and brazing paste 306.

As shown in FIG. 10, the holding surface 302 of the fixture 300 may have a concave contour that substantially matches the outer contour of the arc segments 210a, 210a when they are mated to tubular roller substrate 110. The fixture 300 may be sized and/or shaped to receive a portion of the track roller 200 and span approximately 180 degrees about the circumference of the track roller 200. In some embodiments, the fixture 300 may be a cradle or a tube and holding surface 302 may be a concave surface of the cradle, or the inner surface of the tube. It is noted, however, that the present disclosure is not so limited, and the fixture 300 may, in general, be any apparatus suitable for holding the aforementioned components in place during brazing. For example, the fixture may be a wire or plurality of wires that are threaded through the bore of the substrate, a vise, etc. Additionally, the fixture 300 may be a plurality of pieces that collectively provide holding surface 302 and that are pressed together using a clamp, a vise, etc.

FIG. 11 illustrates an additional or alternative holding fixture that may be used to help produce track roller 200 (or a sprocket, etc.), for example, by brazing a one or more outer members (e.g., arc segment 210a, 210b) to the central portion 218 of the tubular roller substrate 204. As shown, the brazing procedure may include one or more hose clamps 308. Hose clamp(s) 308 may be positioned around central portion 210 and arc segment 210a and tightened to help secure arc segment 210a to central portion 218. As such, a holding surface (not shown) of hose clamp(s) 308 may contact the outer surfaces of central portion 218 and arc segment 210a. Arc segment 210a may then be brazed or otherwise coupled to tubular roller substrate 204, for example, via a brazing filler (not shown), brazing paste 306, etc. Although only one arc segment 210a is shown, it is noted that hose clamp(s) 308 may be positioned around and help secure multiple arc segments to tubular roller substrate.

Moreover, even though two hose clamps 308 are shown, one, three, or more hose clamps 308 may be used to help secure one or more arc segments to the central portion of the tubular roller substrate.

Additionally, although not shown, one or more hose clamp(s) 308 may be used to help couple arc segment to tubular roller substrate to form the track roller 200, as shown in FIG. 10, and the track roller 200 with hose clamp(s) 308 may also be positioned in holding fixture 300, as shown in FIG. 10.

Figure 12:
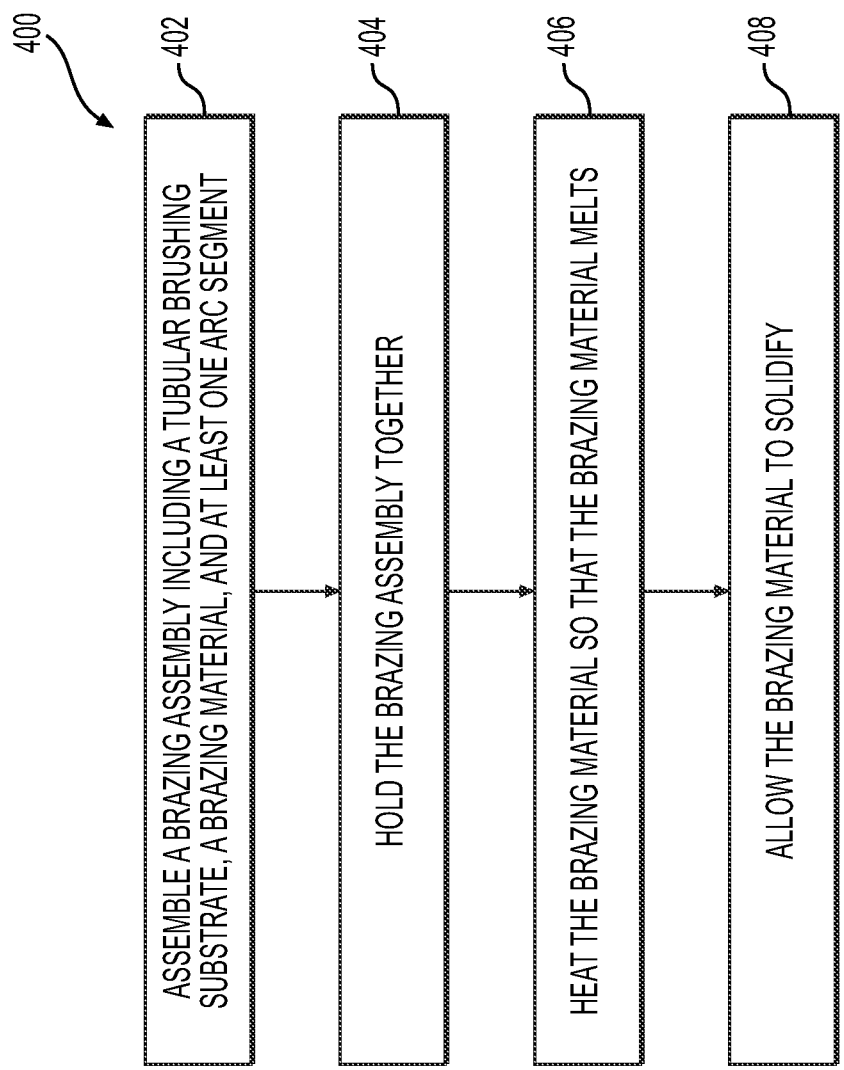
FIG. 12 is a flowchart depicting a method of brazing an arc segment to a track roller guide component using one or more of the fixturing techniques shown in FIGS. 10 and 11.

FIG. 12 is a flowchart illustrating a method 400 of brazing an arc segment to a tubular bushing substrate using any of the fixtures or techniques discussed with reference to FIGS. 10 and 11, as well as others not specifically mentioned herein. A step 402 may include assembling a brazing assembly including a tubular or annular substrate (e.g., tubular roller 204, annular sprocket substrate 120), a brazing material (e.g., brazing filler 304 and/or brazing paste 306), and at least wear member (e.g., a white iron member). In the brazing assembly, the wear members 110, 210 may be mated to tubular or annular substrate, with brazing filler 304 interposed between the substrate and the wear member. Brazing filler 304 may initially be in the form of a foil that is positioned around at least the portion of outer surface of the substrate that is to be mated with the wear member. Additionally, or alternatively, brazing paste 306 may be applied around the edges of the wear member.

A step 404 may include holding the brazing assembly together, for example, using a fixture 300, a vise, and/or hose clamp(s) 308, etc. In step 404, for example, holding surface 305 may hold the wear members in place on the substate. Alternatively, or additionally, as shown in FIG. 10, one or more hose clamps 308 may be positioned and tightened around the wear member and the substrate to help hold the wear member in place.

Next, a step 406 may include heating the brazing material (e.g., brazing filler and/or brazing paste) so that the brazing material melts. In this aspect, brazing filler may melt and/or flow between the substrate and the wear member. Moreover, heating may cause brazing paste to melt and/or flow between the substrate 110 and the wear member. Heating may also help to remove (i.e., burn off) the filler material in brazing paste. The brazing may be performed in a furnace, for example, a vacuum furnace. The heating may be performed while holding the brazing assembly together using a fixture, hose clamps, a vise, etc.

A step 408 may then include solidifying the brazing material, for example, brazing filler and/or brazing paste. In step 408, the brazing material may be cooled and solidified so that the wear members are joined to the substrate via the solidified brazing material. In one aspect, a rotating track guide component may be removed from the furnace and quenched. The entire brazing assembly may be heated in step 406 and cooled in step 408. Although not shown, in an instance where wear members abut one another or are closely positioned circumferentially around the substrate, the solidified brazing filler and/or solidified brazing paste may also join the adjacent wear members to one another, for example, by partially or fully flow into and filling a gap between wear members (i.e., gap 230 in FIG. 9).

Although embodiments using brazing have been described, it is also possible to attach the sprocket segments, wear members, etc. to a substrate or a hub using other suitable forms of attachments. For example, other forms of attachments may include soldering (e.g., high strength soldering), mechanical press fitting, welding (e.g., plasma-transferred arc (PTA) welding), and/or attachment via epoxy and/or other adhesives. It is noted that the various forms of attachments are not intended to be mutually exclusive and may be used in combination with one another. Furthermore, one or more wear members may include more than one flat inner surface, for example, an inner surface with two flat surfaces forming a V-shaped inner surface. One or more wear members may also include three or more flat inner surfaces. Moreover, any substrate may include one or more outer surfaces that correspond to the inner surface(s) of the one or more arc wear members. For example, if the wear member includes a V-shaped inner surface, the substrate may include a V-shaped outer surface to match. The substrate and the one or more arc wear members may be coupled, as discussed above.

As described above, any of the wear members discussed herein may be made of white iron, which provides for wear resistance. The white iron material of the wear members may be different from the material of any underlying substrate(s). Therefore, the wear members may serve as a specialized wear-resistant layer that confers wear resistance to a rotating track guide component (e.g., a track roller, a sprocket, etc.) while avoiding potential expenses of having the entire rotating track guide component be constructed of the same wear-resistant material. Moreover, the rotating track guide component may be formed of thinner material, with the wear members helping to increase the wear resistance and useful life of the component. Any of the substrates may additionally have wear-resistant properties, such as a high-carbon chromium steel composition or a carburized layer as described above. Therefore, if a wear member becomes worn out, a rotating guide component using that wear member may still function with a degree of wear resistance, delaying needed maintenance.

It will be apparent to those skilled in the art that various modifications and variations can be made to the disclosed system without departing from the scope of the disclosure. Other embodiments of the system will be apparent to those skilled in the art from consideration of the specification and practice of the bushing for a track assembly disclosed herein. It is intended that the specification and examples be considered as exemplary only, with a true scope of the disclosure being indicated by the following claims and their equivalents.

What is claimed is:

1. A track roller for a track assembly, comprising:
   a tubular roller substrate having a longitudinal length and an outer surface, wherein the outer surface includes at least one flat portion or at least one curved portion, the tubular roller substrate further comprising outer flanges on opposite ends thereof, the outer flanges configured to contact outer surfaces of track links of the track assembly such that the track links are disposed between the outer flanges; and
   at least one wear member, wherein the at least one wear member includes an inner surface comprising a flat inner surface or a curved inner surface, and the at least one wear member is brazed to the outer surface of the tubular roller substrate with the at least one flat portion of the tubular roller substrate mating with the flat inner surface of the at least one wear member, or at least one curved portion of the tubular roller substrate mating with the curved inner surface of the at least one wear member,
   wherein the at least one wear member comprises an outer surface opposite the inner surface, wherein the outer surface of the at least one wear member is an arcuate surface, wherein the arcuate surface of the at least one wear member is configured to contact top surfaces of the track links.

2. The track roller of claim 1, wherein the at least one wear member is at least one white iron member, and the at least one white iron member extends less than an entirety of the longitudinal length of the tubular roller substrate.

3. The track roller of claim 2, wherein the tubular roller substrate is formed of steel, and at least a portion of the tubular roller substrate is carburized, induction hardened, or directly hardened.

4. The track roller of claim 1, wherein the at least one wear member includes two white iron members, and wherein the two white iron members are spaced apart circumferentially around the tubular roller substrate, and the two white iron members each span a circumferential angle of approximately 45 to 120 degrees of the tubular roller substrate.

5. The track roller of claim 1, wherein the at least one wear member comprises a plurality of white iron members, wherein each of the white iron members is brazed to the tubular roller substrate.

6. The track roller of claim 5, wherein the white iron members form gaps between circumferentially adjacent white iron members, and at least one of the white iron members is a different size than another of the white iron members.

7. The track roller of claim 1, wherein the tubular roller substrate is hollow having a bore that extends completely through the tubular roller substrate along the longitudinal length.

8. The track roller of claim 7, wherein the tubular roller substrate is an assembly of at least two roller components.

9. The track roller of claim 1, wherein the outer surface of the at least one wear member extends beyond the outer surface of the tubular roller substrate.

10. The track roller of claim 9, wherein the tubular roller substrate includes at least one recess formed in the outer surface, the at least one recess including the at least one flat portion or the at least one curved portion,
    wherein the at least one wear member is positioned within the at least one recess,
    wherein the at least one wear member is brazed to the outer surface of the tubular roller substrate with the inner surface of the at least one wear member mating with the outer surface of the tubular roller substrate, such that the outer surface of the at least one wear member extends from the at least one recess beyond the outer surface of the tubular roller substrate.

11. A track roller for a track assembly, comprising:
    a tubular roller substrate having a longitudinal length and an outer surface, wherein the outer surface includes at least one flat portion, wherein the tubular roller substrate further includes flanges configured to contact outermost surfaces of track links of the track assembly; and
    at least one wear member, wherein the at least one wear member includes a flat inner surface, and the at least one wear member is brazed to the outer surface of the tubular roller substrate with the at least one flat portion of the tubular roller substrate mating with the flat inner surface of the at least one wear member,
    wherein the at least one wear member comprises an arcuate surface configured to contact a surface of the track links other than the outermost surfaces.

12. The track roller of claim 11, wherein the at least one wear member is at least one white iron member, and the at least one white iron member extends less than an entirety of the longitudinal length of the tubular roller substrate.

13. The track roller of claim 12, wherein the tubular roller substrate is formed of steel, and at least a portion of the tubular roller substrate is carburized, induction hardened, or directly hardened.

14. The track roller of claim 11, wherein the at least one wear member includes two white iron members, and wherein the two white iron members are spaced apart circumferentially around the tubular roller substrate, and the two white iron members each span a circumferential angle of approximately 45 to 120 degrees of the tubular roller substrate.

15. The track roller of claim 11, wherein the at least one wear member includes a plurality of white iron members, and each of the white iron members is brazed to the tubular roller substrate.

16. The track roller of claim 11, wherein the at least one wear member includes a plurality of white iron members, the white iron members form gaps between circumferentially adjacent white iron members, and at least one of the white iron members is a different size than another of the white iron members.

17. The track roller of claim 11, wherein the tubular roller substrate is hollow having a bore that extends completely through the tubular roller substrate along the longitudinal length.

18. The track roller of claim 17, wherein the tubular roller substrate is an assembly of at least two roller components.

19. The track roller of claim 11, wherein the outer surface of the at least one wear member extends beyond the outer surface of the tubular roller substrate.

20. The track roller of claim 19, wherein the tubular roller substrate includes at least one recess formed in the outer surface, the at least one recess including the at least one flat portion or at least one curved portion, wherein the at least one wear member is brazed to the outer surface of the tubular roller substrate with the at least one flat portion of the tubular roller substrate mating with the flat inner surface of the at least one wear member, such that the outer surface of the at least one wear member extends from the at least one recess beyond the outer surface of the tubular roller substrate.

* * * * *